June 14, 1960    J. BERNHARD    2,940,571
REVERSIBLE SCREW THREAD CUTTING DEVICE
Filed March 14, 1956    3 Sheets-Sheet 1
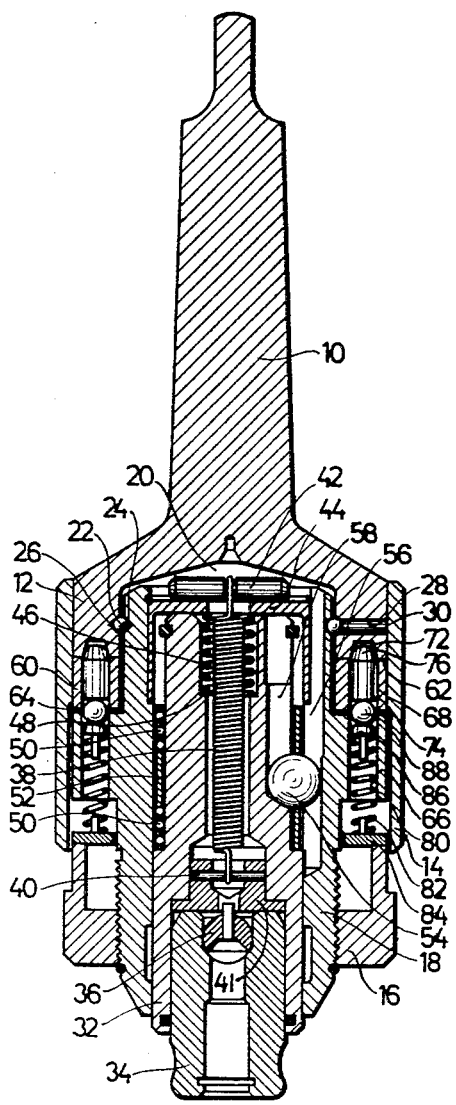
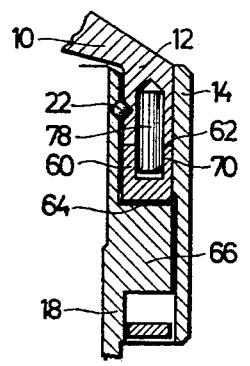
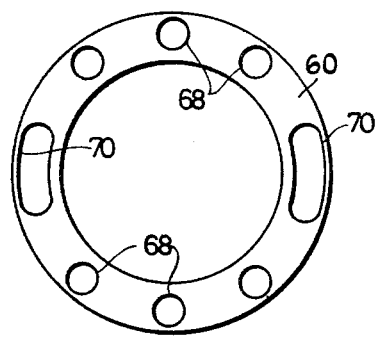
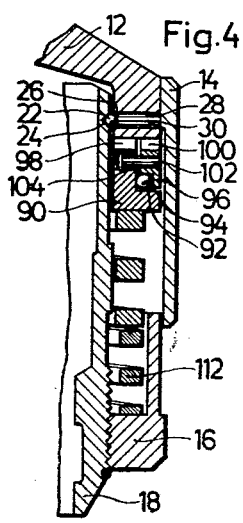
Inventor:
Johann Bernhard
By: B. Schlesinger
Attorney June 14, 1960 J. BERNHARD 2,940,571
REVERSIBLE SCREW THREAD CUTTING DEVICE
Filed March 14, 1956 3 Sheets-Sheet 2

Inventor:
Johann Bernhard
By:
Attorney

June 14, 1960  J. BERNHARD  2,940,571
REVERSIBLE SCREW THREAD CUTTING DEVICE
Filed March 14, 1956  3 Sheets-Sheet 3
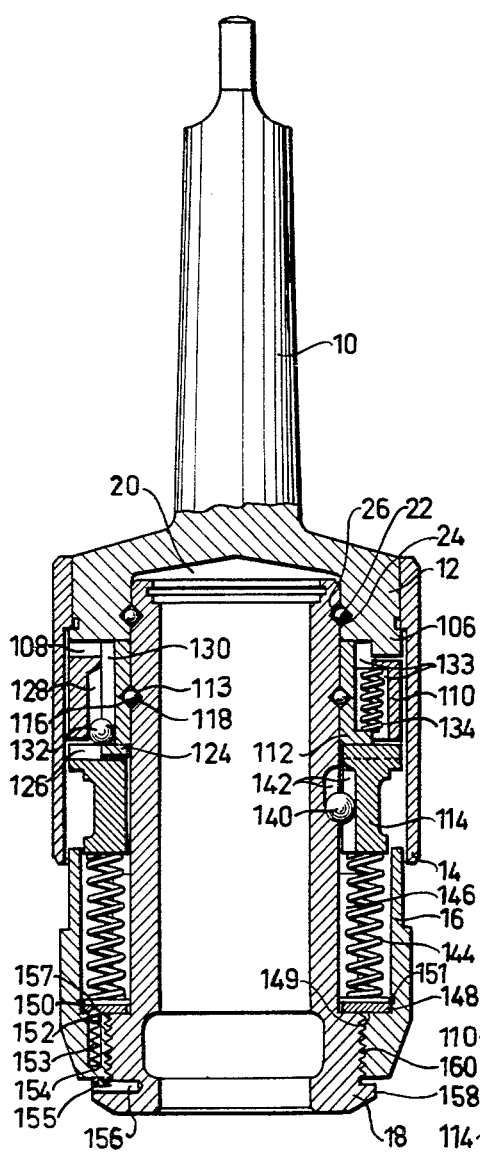
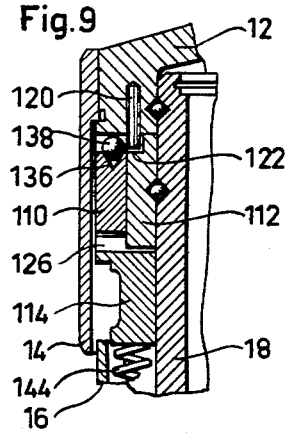
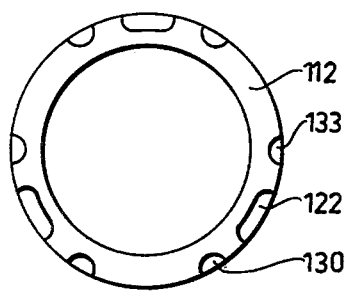
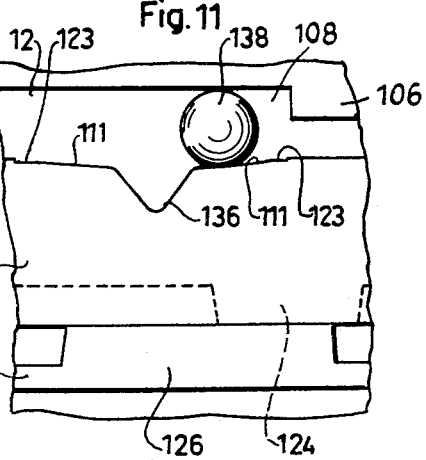
Inventor:
Johann Bernhard
By: Ohshlesinger
Attorney United States Patent Office 2,940,571
Patented June 14, 1960

2,940,571

REVERSIBLE SCREW THREAD CUTTING DEVICE

Johann Bernhard, Nacka, Sweden, assignor to Aktiebolaget Svenska Precisionsverktyg, Nacka, Sweden, a corporation of Sweden Filed Mar. 14, 1956, Ser. No. 571,510

Claims priority, application Sweden Mar. 18, 1955

11 Claims. (Cl. 192—56)

This invention relates to reversible screw thread cutting devices.

More particularly this invention relates to a coupling between a driving and a driven member of a reversible screw thread cutting device, said coupling comprising two surfaces rotatable relative to one another and extending in planes transverse to the longitudinal axis of the device and provided with at least one coupling element adapted to enter recesses in one surface, said coupling element and said recesses being axially displaceable relatively to one another and adapted at a predetermined value of the torque to take a position where they are disengaged from one another.

Still more particularly this invention relates to a coupling between a driving and a driven member of a reversible thread cutting device of the type particularly adapted for thread cutting of bottom holes.

One main object of the invention is to provide a coupling adapted to cause the torque acting upon the screw tap secured to the driven member totally to cease actuation of said driven member, when the resistance to the turning movement of the tap reaches a predetermined value.

To overcome the difficulties inherent in this problem, several coupling constructions automatically reacting on overload have been proposed heretofore without, however, entirely attaining the desired result, since the force required to disengage the elements of the coupling would continue to act upon the screw tap. Further, if the coupling is of the snap-in type, the screw tap may be stuck fast in the thread and the coupling may overheat because of the friction.

A further object of the invention is to provide a coupling adapted in a more reliable manner than the constructions hitherto known to eliminate the various difficulties mentioned hereinbefore.

Further objects and advantages of the invention will become apparent from the following description considered in connection with the accompanying drawings which form part of this specification and of which:

Fig. 1 is an axial sectional view of a screw thread cutting device provided with a coupling constructed according to one embodiment of the invention.

Fig. 2 is a partial axial section taken perpendicularly to the section shown in Fig. 1.

Fig. 3 is a plan view of an intermediate annular member forming part of the coupling.

Fig. 4 is a partial axial section of a coupling constructed according to a modified embodiment of the invention.

Fig. 8 is an axial sectional view of a screw thread cutting device having a coupling constructed according to still another embodiment of the invention, the central carrier being removed.

Fig. 9 is a partial axial section taken at right angles to the view of Fig. 8.

Fig. 10 is a plan view of an annular member forming part of the coupling shown in Figures 8 and 9.

Fig. 11 is a view in elevation of a part of the coupling shown in Fig. 8, the protecting cap of the device having been removed to illustrate positions relative one another of the coupling members of the device.

Figure 5:
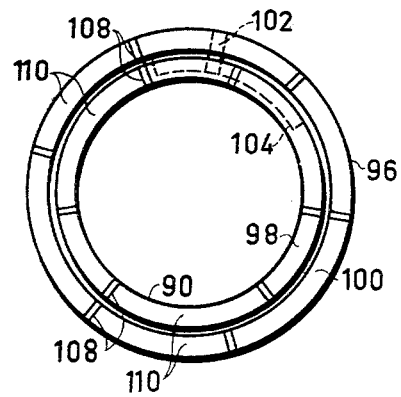
Fig. 5 is a plan view of two annular members comprising in this modified coupling in engaged position.
Figure 6:
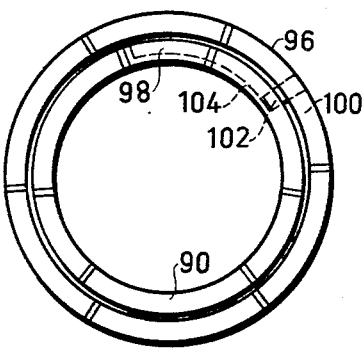
Fig. 6 is a further plan view of the annular members shown in Fig. 5 in disengaged position.

Referring to the drawings, the reference numeral 10 designates the driving spindle of a driving member forming part of a screw thread cutting device, said spindle having its one end widened to form a sleeve shaped portion 12, on the external side of which is secured a protecting sleeve 14 which also partly surrounds a further sleeve 16. Said sleeve 16 is screwed onto a guide body 18 that is mounted in the driving member and that projects axially within a space 20 formed by the portion 12 and the sleeves 14, 16. It is held in said portion by means of balls 22 that run in opposed annular grooves 24, 26 provided in the guide body 18 and the portion 12, respectively. The balls 22 may be introduced through a radial bore 28 that is thereafter closed by means of a plug 30. Concentrically within the guide body 18 is mounted a further sleeve member 32 carrying on its one end a holder 34 for a screw tap not shown in the drawing. The holder 34 is driven by a pin 36 on rotation of the sleeve 32. The sleeve member 32 with the holder 34 is suspended and balanced by a spring 38 secured at one end on a pin 40 disposed in a cap member 41 that engages in a recess in sleeve 32 and secured at its other end to a pin 42 carried by an end cap 44 of the member 32 that seats in a recess in the bore of guide body 18. A second spring 46, more powerful but shorter than the spring 38, is inserted between the end cap 44 and an abutment 48 of the member 32. Said spring 46 has for its object to impart a certain resiliency to the member 32, when the screw tap is set against the workpiece.

The bearing between the guide body 18 and the inner sleeve member 32 is provided by a great number of small balls 50 inserted between the cylindrical surfaces of said guide body and said sleeve member. The balls are kept in their position by a ball holder 52, which also fixes the position of a single ball 54 having a diameter considerably larger than that of the balls 50. The ball 54 transmits the torque between the guide body 18 and the sleeve member 32 due to its entering axial grooves 56 and 58 provided in said body and said sleeve member 32, respectively. For the particulars of the construction and operation of the torque transmitting ball reference is made to the specification of the Patent 2,592,103 to U. A. Alfredéen.

To transmit the rotary movement of the driving member substantially constituted by the spindle 10 with its sleeve shaped portion 12, to the driven member broadly comprising the guide body 18 and the inner sleeve 32 with its holder 34, there is provided a coupling between said members. Said coupling may have the construction shown in Figures 1 to 3 and include an annular member 60 interposed between two annular surfaces extending in planes perpendicular to the axis of rotation of the screw thread cutting device. The upper of said annular surfaces, which is denoted by 62, is formed on the lower edge of the widened portion 12 of the driving spindle 10, the other, which is denoted by 64, being formed on an annular flange 66 that projects from the guide body 18. Provided in the interposed annular member 60 is a number of axially extending through-bores 68, circumferentially evenly distributed in two diametrically opposed groups, each comprising three bores in the embodiment illustrated in the Figures 1 to 3. Between said groups of bores and symmetrically distributed relatively to them, there are further provided in said annular member 60 two diametrically opposed elongated grooves 70 following the curvature of the peripheral surface of member 60. The surface 62 of the portion 12 is provided with correspondingly distributed, upwardly tapering recesses 72 to receive the upper ends 76 of pins 74 disposed so as to be axially displaceable within the bores 68. Said upper ends 76 are tapered corresponding to the recesses 72. The opposite ends of the pins 74 are squarely cut. In the embodiment illustrated in the Figures 1 to 3 the length of the pins equals the thickness of the annular member 60. Projecting from the surface 62 are two diametrically opposed pins 78 (Fig. 2) rigidly secured to the portion 12. In the position of the annular member 60 when its holes 68 are opposite the recesses 72, said pins 78 project into the middle of the elongated grooves 70. The annular flange 66 of the guide body 18 is formed with axially extending throughbores 80 distributed exactly as the bores 68 and adapted to receive helical springs 82. Each of said springs bears at one end on an annular member 84 mounted on the sleeve 16, and its other end carries a seat 86 which in turn carries a body 88 comprising a ball or a pin formed with a spherical end. The bodies 88 are so dimensioned as to be slidably displaceable within the bores 68 and 80 having substantially the same diameter.

With the elements of the coupling in the position shown in Fig. 1, the torque is transmitted from the spindle 10 to the annular member 60 through the ends 76 of the pins 74 that project into the recesses 72, and from the annular member 60 to the guide body 18 by the spherical coupling bodies 88 that are retained by the springs 82 in position, wherein they project both into the bore 68 of the annular member 60 and into the bore 80 provided in flange 66 of the guide body 18. When in the operation of screw thread cutting of a bottom hole, for example, the screw tap has reached the bottom of the holes and the torque increases above a predetermined value, the pins 74 are pressed, due to the form of their ends 76 and the recesses 72, out of said recesses 72, to slide onto the portions of the surface 62 located between the bores 68. Simultaneously the annular member 60 is turned so as to force the pins 78 into engagement with one end of the elongated grooves 70. In this position of the pins 74, their squarely cut ends will be located on a level with the lower surface of the annular member 60, the spherical bodies 88 at the same time being retained depressed into the bores 80. The lower ends of the pins 74 thus register with the lower surface of the annular member 60, and the bodies 88 roll or slide thereon with little friction, and without any torque being transmitted from the spindle 10 to the guide body 18 and to the ball 54 of the element 32 carrying the screw tap holder 34. When the tap is to be withdrawn out of the finally screw threaded hole, the pins 78 cause the annular member 60 to rotate in the opposite direction. This rotation carries the pins 74 back to their initial positions in the holes 72 and the torque will again be transmitted, but due to the reversed rotation of the spindle 10, in the opposite direction. If during the operation of withdrawing the screw tap the torque should exceed the predetermined value, disengagement will again be caused in the manner above explained. As is readily understood, the pins 78 then will lock the annular member 60 by engaging the opposite end of the elongated holes 70. To continue the reverse movement, it is required that the rotary movement of the spindle be again reversed so as again to allow power transmission. The value of the torque at which the coupling will disengage is adjustable by variation of the tension of the spring 82. Said variation is easily effected by turning the sleeve 16 on the guide body 18 with which said sleeve is in threaded engagement.

In the embodiment shown in Figs. 4 to 7, the coupling comprises an annular member 90 in driving connection with the guide body 18. Said member 90 has an annular recess 92 formed along its upper and outer surface. Said recess supports a further annular member 96 by means of balls 94. Both annular members 90 and 96 are formed on their upper faces with a plurality of peripherally extending shoulders 98 and 100, respectively, the number of which in the embodiment illustrated is three on each annular member. Said shoulders are equally spaced from one another about the axis of the coupling and the shoulders 98 on the inner annular member 90 have a smaller peripheral dimension than the shoulders 100. The top surfaces of the shoulders 100 may be located at the same level or slightly higher than the top surfaces of the shoulders 98. To limit the turning movement of the annular members relative one another, the outer member is provided with a pin 102 adapted to engage in an arcuate slot 104 extending part-way around the annular member 90. To transmit a torque from the driving member 10 to the driven member 18, shoulders 106 are formed at the free base edge of the sleeve portion 12 of the spindle 10. In the embodiment shown, the width of said shoulders is substantially equal to the combined width of the annular members 90 and 96, and their peripheral length preferably equals that of the shoulders 98.

Figure 7:
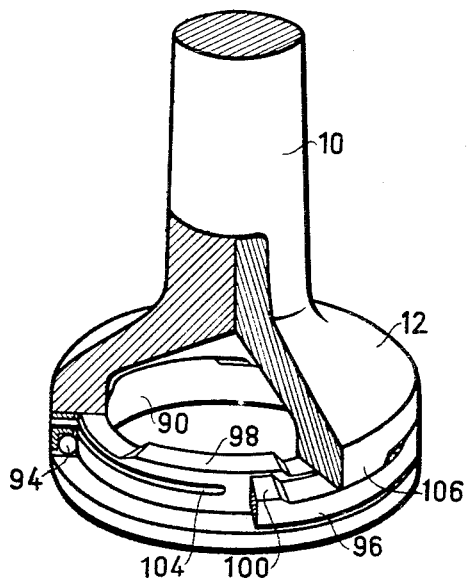
Fig. 7 is a perspective view of these same two annular members, in the engaged position shown in Fig. 5, and also showing a driving spindle comprised in the device.

In the position of the coupling members shown in Figures 4, 5 and 7, the driving member is in a driving connection with the driven member, the one end 108 of the shoulders 98, 100 of the annular members being radially located opposite one another and in engagement with the shoulders 106 which occupy the interspace 110 formed by the shoulders of the outer and the inner annular members, respectively. When the torque exceeds a predetermined value, that is adjustable by means of a spring 112, that is interposed between the system of annular members and the sleeve 16 (Fig. 4) and whose degree of compression can be adjusted by rotating said sleeve, the shoulders 106 will slide up onto the upper surfaces of the shoulders 98, 100. This sliding movement is made possible by the inclined end surfaces of all the shoulders. As the outer annular member 96 easily turns about the inner annular member 90 due to its mounting on the balls 94, the outer member in the embodiment shown will be displaced in a clockwise direction until the pin 102 reaches the end of the slot 104, in which position the annular members are fixed relatively to one another as far as this turning direction is concerned. The shoulders 98, 100 then take the position shown in Fig. 6, with the inner shoulders 98 substantially located in register with the interspaces between the outer shoulders 100 of the outer annular member, affording a substantially uninterrupted path for sliding movement of the shoulders 106, and as a consequence, substantially disconnecting the driving member 10 from the driven member 18.

Upon reversal of the rotary direction of the driving member 10, the outer annular member 96 will in an analogous manner turn in a counterclockwise direction, until the pin 102 reaches the opposite end of the slot 104. Then the annular members are again fixed relatively one another in a position to leave open spaces extending transversely over the annular members and having a magnitude permitting the shoulders 106 to enter said spaces. A connection is thus established again between the driving and driven members. If during the reverse movement the torque should exceed the predetermined value, the shoulders will again slide up onto the annular members, but as the turning position of said members relative to one another is fixed, this position is maintained during the rotation of the driving spindle. The shoulders 106 are thus urged continuously to snap down into the spaces between the shoulders 98 and 100.

This intermittently effected coupling of the driving and driven members of the device provides a particular advantage during the reverse movement, particularly if the screw thread cutting operation is performed in a relatively soft material which has a tendency to lock the screw tap.

The embodiment of the coupling shown in Fig. 8 likewise comprises a spindle 10 having a widened portion 12 and, the protecting sleeve 14, the sleeve 16 and the guide body 18 located in the space 20. The sleeve shaped portion 12 is rotatable as in the preceding embodiments, but in the axial direction it is rigidly connected to the guide sleeve 18 by means of the balls 22 running in the opposed roller ways 24, 26. In the same manner as is shown in Fig. 7 representing the preceding embodiment, the portion 12 of the spindle 10 is formed with three peripherally evenly spaced shoulders 106 leaving interspaces 108 therebetween. The transitions or faces between the interspaces and the shoulders are preferably located in axial planes. The coupling between the driving member and the driven member, i.e. primarily the guide body 18, is substantially constituted by two annular members 110, 112 disposed concentrically relative to one another and located adjacent the sleeve shaped portion 12, and by a further annular member 114 underneath the annular member 110. The inner member 112 of the first-mentioned pair of annular members is rotatably but axially stationarily mounted on the guide body 18 by a plurality of balls 113 inserted into two annular roller ways 116, 118 facing one another and provided in the ring 112 and the guide body 18, respectively. The rotary movement of the member 112 relative the spindle 10 is limited by means of circumferentially evenly spaced pins 120, the number of which is three in the illustrated embodiment, and which in the axial direction are rigidly secured in the portion 12 and have projecting end portions engaged in recesses 122 provided in evenly spaced relation about the circumference of the annular member 112. Evenly spaced shoulders 124 are formed in the lower circumferential edge of the member 112, the device illustrated in the Figures 8 to 10 having three such shoulders intended to engage correspondingly formed and spaced shoulders 126 on the adjacent circumferential edge of the annular member 114. The concentric pair of annular members 110, 112 are held rotationally stationary relative to one another by having their opposed surfaces formed with semicylindrical, axially extending grooves 128, 130 housing balls 132. These grooves are uniformly spaced about the axis of the coupling. The embodiment illustrated has three pairs of grooves, each pair being formed in the opposed end side walls of the three annular members and extending almost to the opposite end edge surfaces of the members 110 and 112, respectively so as to cause the remaining portions of the members to hold the balls 132 locked in the channels thus formed by the pairs of grooves. A similar system of channels, forming grooves 133 with uniform circumferential spacing between the first-mentioned grooves is formed in the annular members 110 and 112 to house axially extending helical springs 134. These springs 134 permit an axial spring-loaded displacement of the annular members 110 and 112 relative one another. The upper end edge of the annular member 110 has shallow recesses 136, which may be V-shaped grooves, as is shown in Fig. 11. Said recesses house balls 138, that project above the groove edge to co-operate with the recesses or spaces 108 and shoulders 106 of the driving member 12. On both sides of the recesses 136 the upper end edge surface of the annular member 110 is formed with surface portions 111 sloping toward the recesses at an angle of a few degrees relative to a radial plane. The surface portions 111 constitute roller ways for the balls 138, as will be described more in detail hereinafter. Said portions 111 merge with steps 123 extending in other radial planes, leading to the end edge surface of the annular member 110. The lower end edge of the member 110 is plane, and is thus adapted to slide on the shoulders 126 of the annular member 114. Said member 114 is rotationally stationary but axially displaceable relative to the guide body 18 due to a ball 140 housed in a channel formed by the axial grooves 142 provided in opposed surfaces of said annular member 114 and said guide body 18. Axial displacement of the member 114 is effected against the action of a plurality of axially extending helical springs 144 that are uniformly distributed circumferentially about the lower edge of the member. The preferred number of springs is twelve in the embodiment illustrated, and they are inserted in semi-cylindrical recesses 146 extending in the axial direction and provided about the external face of the guide body 18 and the internal face of the outer sleeve 16. The lower ends of the springs 144 rest on an annular member 148 that is rotatably mounted on a shoulder 149 formed in the interior of the sleeve 16. Said annular member is kept in contact with said shoulder by means of a washer 150, that is engaged in an annular groove 151 provided in the inner wall of the sleeve 16. The member 148 has semicircular projections along its interior periphery, said projections being distributed in the same manner as the recesses 146 that house the springs 144. Further, the member 148 has four depressions 157 diametrically opposed in pairs and extending from the lower surface of the member. Each depression houses a ball 152 pressed against the member 148 by the action of a helical spring 153. Said springs 153 are located in axial bores provided in the lower portion of the sleeve 16. For the purpose of varying the tension of the springs 144 and consequently the pressure of said springs against the annular member 114, the sleeve 16 is threaded onto the guide body 18, as is indicated at 160.

A locking device is provided to prevent jamming between the lower end of the sleeve 16 and a stop shoulder 158 formed on the guide body 18, said locking device being formed so as to become operative before said sleeve comes into contact with the shoulder when the sleeve is screwed down on the body. In the illustrated embodiment the locking device comprises an axial shoulder 155 projecting from the end of the sleeve, and a radial pin 156 rigidly secured to the guide body 18. As will be readily understood, a peripherally directed locking force is thus created, which prevents jamming during any axial displacement of the sleeve 16 and the guide body 18 relative to one another.

When a thread cutting operation is to be commenced, the various elements of the thread cutting device described hereinbefore take the positions illustrated in the Figures 8 and 9. The power transmission from the driving spindle 10 is effected through the shoulders 106, which are in engagement with the balls 138, to the outer annular member 110, and thence through the balls 132 to the inner coupling annular member 112, which in turn transmits the torque through its shoulders 124 to the annular member 114, by engaging the shoulders 126 of said member. The power is then transmitted to the guide body 18 and from the latter to the members (not shown) in the Figures 8 to 11 carrying the screw tap chuck. When in the operation of boring a bottom hole the screw tap reaches the bottom of the hole and, the torque increases momentarily between the driving and driven members. The balls 138 of the outer annular member 110 will then leave the grooves 136 and roll up onto the sloping portions 111 of said member, as is illustrated in Fig. 11.

When the balls 138 have passed over a predetermined portion of said sloping tracks 111, the axial displacement of the annular member 110 will have proceeded so far as to bring the lower uninterrupted end edge surface of said member to a level with the lower surfaces of the shoulders 124 of the inner annular member 112, which shoulders thus disengage from the shoulders 126 of the lower annular member 114, resulting in interruption of the torque acting on the member 18 that carries the screw tap. However, since sliding friction still exists between the uninterrupted plane lower end surface of the annular member 110 and the shoulders 126 of the annular member 114, the balls 138 are caused to continue their upward rolling movement on the sloping portions 111 to an end position on the steps 123, which position is determined by the pins 120 encountering one end of the recesses or grooves 122 provided in the inner annular member 112. As is readily understood, this continued rolling motion results in a further slight axial displacement of the member 110 and the lower member 114 producing an axial play, depending on the angle of inclination and the length of the sloping portions 111, between the shoulders 126 of the annular member 114 and the shoulders 124 of the inner annular member 112. The operation described ensures a uniform and vibrationless disengagement of the coupling along an uninterrupted path at the very moment when the screw tap reaches the bottom of the hole subjected to the thread cutting operation. When the screw tap is to be removed from the hole, the spindle 10 is caused to rotate in the opposite direction, the balls 138 of the outer annular member 110 then roll back into the grooves 136, as is readily understood. As a consequence, the annular member 110 is moved upwardly by the action of the springs 134. This movement causes the shoulders 126 of the lower annular member 114 again to engage the shoulders 124 of the inner annular member 112. The member 114 is thus caused to rotate, and its rotary movement is transmitted through the ball 140 to the guide body 18, and from said body to the screw tap.

While several more or less specific embodiments of the invention have been shown and described, it is to be understood that this is for purpose of illustration only, and that the invention is not to be limited thereby, but its scope is to be determined by the appended claims.

What I claim is:

1. A coupling for a screw thread cutting device or the like comprising a rotary driving member, a rotary driven member, and clutch means to connect said members to transmit a torque and to disconnect said members when said torque exceeds a predetermined value, said clutch means including three elements, one of said elements being adapted to be driven by said driving member and having a toothed surface, a second of said elements being mounted coaxially with said first element in axially-spaced relation thereto and being formed with a toothed surface opposed to the first-named toothed surface and adapted to cooperate therewith, said two elements being movable axially relative to each other, said toothed surfaces being mounted to engage to transmit torque, and said third element being mounted coaxially of one of said other two elements and being formed with a smooth annular surface, said third element being mounted to move axially at and above a predetermined torque to force its smooth annular surface to engage one of said toothed surfaces to move one of said first two elements axially to disengage said cooperating toothed surfaces and to hold said toothed surfaces out of engagement, and said third element being spring-pressed to disengage said one toothed surface below said predetermined torque to permit said toothed surfaces to engage to transmit said torque.

2. A coupling for a screw thread cutting device or the like comprising a rotary driving member, a rotary driven member, and clutch means to connect said members to transmit a torque and to disconnect said members when said torque exceeds a predetermined value, said clutch means including three cooperating coaxially mounted drum-like elements, a first of said elements being mounted to be driven by said driving member, a second of said elements being mounted to move axially of said driven member and to rotate with said driven member, said first and second elements having cooperating faces spring-pressed into engagement and formed with projections and recesses to engage to transmit torque from said driving member to said driven member, said third element being mounted to be driven by said driving member and for axial movement relative to said first and second elements, said third element having a smooth annular surface mounted to engage at least a portion of said face of said second element, said driving member having a face formed with a plurality of axially-projecting shoulders, said third element having a radial face mounted to confront the radial face of said driving member and formed with a plurality of recesses that have sides inclined to the axis of said element, a plurality of balls interposed between said radial faces and corresponding in number to said recesses, and spring means mounted constantly to urge said third element axially to urge said radial faces toward one another and to seat said balls in said recesses below a predetermined value of torque, and to permit said shoulders to engage said balls to move them out of their respective recesses to shift said third element axially relative to said driving member at and above a predetermined value of torque to engage the smooth annular surface of said third element against the face of said second element to shift said second element axially to disengage said cooperating faces to permit said driving member to rotate freely relative to said driven member and to permit said smooth annular surface of said third element to slide on the face of said second element.

3. A coupling for a screw thread cutting device or the like comprising a rotary driving member, a rotary driven member coaxial therewith, and clutch means to connect said members to transmit torque and to disconnect said members when said torque exceeds a predetermined value, said clutch means including three rings mounted coaxial with said members, means for connecting said first ring to said driving member to drive said first ring from said driving member, said first ring being provided with projections equi-angularly spaced about the common axis of said members, a second ring mounted to rotate with said driven member in axially-spaced and axially-movable relation to said first ring, said second ring being formed with a plurality of portions equi-angularly spaced about said common axis and adapted to engage the projections of said first ring, spring means constantly urging said second ring axially to place said portions in engagement with said projections, said third ring being mounted coaxially of said first ring and for limited axial movement relative to said members and said first and second rings, said third ring having a plurality of equi-angularly spaced recesses in its upper face, said recesses having the sides thereof inclined to said common axis, said driving member having its lower face disposed to confront the upper face of said third ring and formed with equi-angularly spaced projections corresponding in number to said recesses, a plurality of balls interposed between said confronting faces and adapted to seat in said recesses to be engaged by said last-named projections to rotate said third ring upon rotation of said driving member, and spring means mounted constantly to urge said third ring axially against said balls to seat said balls in said recesses below said predetermined value of torque, said third ring being formed with a smooth annular lower face disposed at a right angle to said common axis, the said portions of said second ring having plane upper faces confronting said annular lower face of said third ring, the first-named spring means being adjusted to permit the last-named projections to unseat said balls from their respective recesses at and above a predetermined value of torque to move said third ring axially to engage the smooth lower face thereof against the plane upper faces of the said portions of said second ring and to move said second ring axially to disengage said portions from the first-named projections to permit said driving member to rotate freely relative to said driven member and to permit said smooth face of said third ring to slide on the engaged plane upper faces of the said portions of said second ring.

4. A coupling for a screw thread cutting device or the like, comprising a rotary driving member, a rotary driven member, and clutch means to connect said members, said clutch means including three elements for transferring the torque from the driving member through all of said three elements to the driven member, the first of said elements being adapted to be driven by said driving member and mounted coaxially on the driven member, said first element having teeth at its lower end, a second of said elements being mounted coaxially with the said first element in axially spaced relation thereto and being formed with teeth opposed to the first named teeth and adapted to mesh therewith, said second element being movable axially relative to the first element and the driven member, and a third element surrounding said first element and being coaxial therewith and having a smooth annular surface extending at right angles to the common axis of said elements, said third element being mounted to move axially at and above a predetermined torque to force its smooth annular surface to engage an opposing surface of said second element to move said second element axially to disengage said teeth and to hold said teeth out of engagement.

5. A device according to claim 4 wherein the second element is spring loaded to urge said element axially into toothed engagement with the first element.

6. A device according to claim 4 wherein a plurality of spherical balls is mounted between the driving member and the third of said elements, said balls being adaptable in response to excessive torque to force the third of said elements axially to move the second of said elements an axial distance greater than the height of engagement of the interengaging teeth.

7. A coupling for a screw thread cutting device or the like comprising a rotary driving member, a rotary driven member, and a clutch to connect said members to transmit a torque and to disconnect said members when said torque exceeds a predetermined value, said clutch including three elements, said three elements being arranged in series to transmit the torque from the driving member to the driven member, a first of said elements being adapted to be driven by said driving member and having a toothed surface, a second of said elements being mounted coaxially with said first element in axially spaced relation thereto and being formed with a toothed surface opposed to the first named toothed surface and adapted to cooperate therewith, said second element being movable axially relative to the first element, means for constantly urging the toothed surfaces of said first and second elements into engagement, a third element being mounted coaxially of the first element and surrounding said first element, said third element having a smooth annular lower surface and an upper surface provided with spaced grooves and inclined planes adjoining said grooves, a plurality of balls disposed between the driving member and the third element and normally resting in the said grooves, said third element being mounted to move axially at and above a predetermined torque to force its smooth annular lower surface to engage a surface of the said second element to axially disengage said cooperating toothed surfaces, said third element being axially movable against the resistance of said means when said balls ride on said inclined planes, and means attached to the driving member and the first member for permitting a limited relative rotation between the driving member and the first member when the balls roll on said inclined planes.

8. A device according to claim 7 wherein said rotation-limiting means comprises a plurality of pins, said pins being fixed to the driving member, and said first element having an elongated slot to receive each of said pins.

9. A coupling for a screw thread cutting device or the like comprising a rotary driving member, a rotary driven member coaxial therewith, and clutch means to connect said members to transmit torque and to disconnect said members when said torque exceeds a predetermined value, said clutch means including a first annular ring surrounding said driven member and rotatable relative thereto, a second annular ring surrounding said driven member and coaxial therewith, said first and second rings having interengaging portions on their respective upper and lower surfaces, means for constantly urging said interengaging portions into engagement, a third ring coaxially mounted with said first ring, means between the first and third rings for locking the said rings against relative rotation, said third ring being axially movable with respect to said first ring, said third ring having an upper annular surface having a plurality of grooves therein, a plurality of balls between the driving member and the upper surface of the third ring, each normally resting in a respective groove, the lower surface of said third ring being a smooth surface adapted to slide on the upper surface of said second ring, said third ring being moved axially in response to the displacement of the said balls in their respective grooves in response to an excessive torque, said axial displacement causing the first and second rings to disengage, and means between the driving member and the first ring for limiting the relative rotation between them when the clutch interengaging means are out of engagement.

10. A coupling for a screw thread cutting device or the like having coaxial driving and driven members, comprising three elements coaxial with said driving and driven members, a first inner element, a second outer element surrounding the inner element, and a third element displaced axially from the outer and inner elements, means connecting said third element to said driven member to transmit torque between said third element and said driven member, a second means connecting said first and second elements to transmit torque from said second element to the first element, said first and third elements having normally intermeshing teeth on confronting opposed end faces, first spring means constantly urging said teeth axially into meshing engagement, said second element having grooves in one end face and having surfaces between said grooves which are inclined to a plane perpendicular to said common axis, a plurality of balls interposed between said one end face of said second element and said driving member, said balls normally engaging in said grooves, said driving member having shoulders on one end face for engaging said balls to transmit torque to said second element when said balls are in said grooves, said second element having a plane end face at its opposite end extending at right angles to the common axis of said second element, the teeth of said third element having end faces lying in a plane at right angles to said common axis and on which said plane end face of said second element can slide, second spring means constantly urging said second element away from said third element normally to maintain said plane faces out of engagement, said driving member being rotatable relative to said second element when the torque transmitted by said clutch exceeds a predetermined value, to cause said balls to ride up on said inclined surfaces to stop transmission of torque between said driving member and said second element, and to move said plane surfaces into engagement, and lost-motion means connecting said driving member and said first element to limit their relative rotational movement.

11. A thread-cutting device comprising a rotary driving part, a rotary driven part, and means arranged in series between said parts for transmitting torque between said parts comprising a plurality of torque-transmitting, relatively axially movable annular members, one of said annular members and one of said parts having confronting faces, one of said faces having shoulders thereon, the other face having recesses therein and having inclined portions adjoining said recesses, balls interposed between said faces and cooperating with said shoulders and recesses to effect transmission of torque between said one part and said one annular member, separate coupling means disengageably connecting two of said annular members, springs constantly urging said balls and said coupling means toward engaged torque-transmitting position, one of said annular members having a smooth surface extending for a distance around its axis, said balls being adapted when a predetermined value of torque is exceeded to move out of torque-transmitting position and to roll on said inclined portions and onto said smooth surface thereby to move said coupling means out of operative position, said balls when engaged with said smooth surface being operative to keep said coupling means positively in inoperative position and allow rotation of said driving part without transmission of torque to said driven part.

References Cited in the file of this patent

UNITED STATES PATENTS

| | | |
|---|---|---|
| 1,537,629 | Street | May 12, 1925 |
| 2,375,554 | Hook | May 8, 1945 |
| 2,412,630 | Nelson | Dec. 17, 1946 |
| 2,540,513 | Dodd | Feb. 6, 1951 |
| 2,729,076 | Thomson | Jan. 3, 1956 |
| 2,730,220 | Dodd | Jan. 10, 1956 |

FOREIGN PATENTS

| | | |
|---|---|---|
| 796,845 | France | Feb. 3, 1936 |
| 462,587 | Great Britain | Mar. 11, 1937 |